May 17, 1949.  C. P. LEESE  2,470,172
FRICTION BOLSTER SPRING
Filed March 8, 1944  3 Sheets-Sheet 1
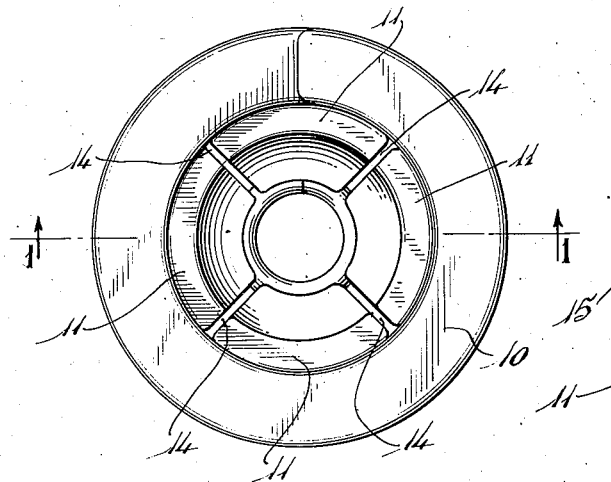
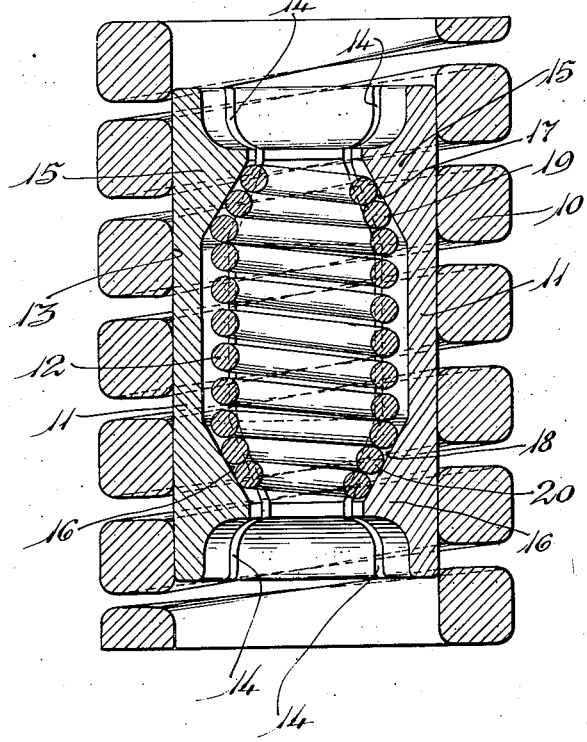
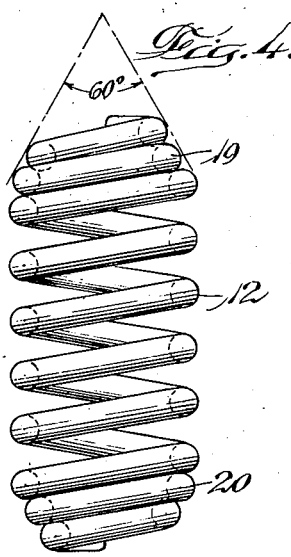
Inventor:
Charles P. Leese
By Barnett & Truman
Attorneys.

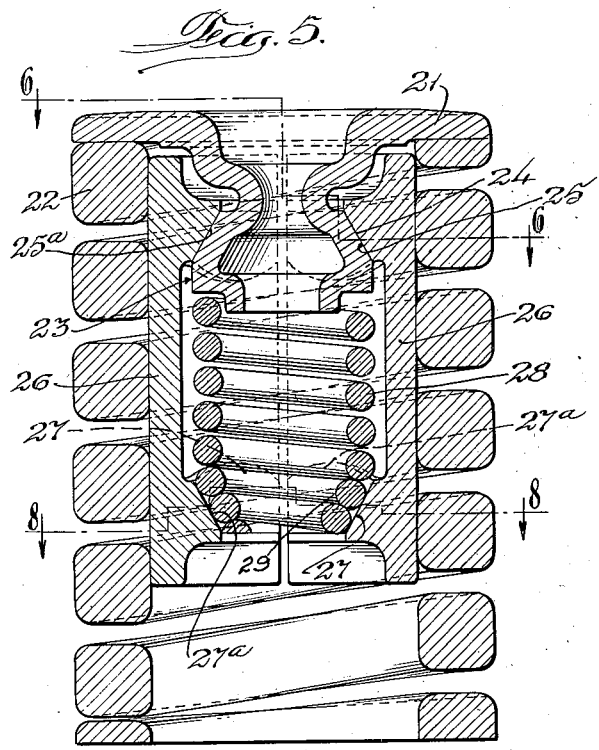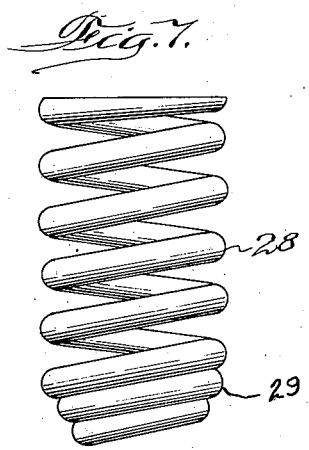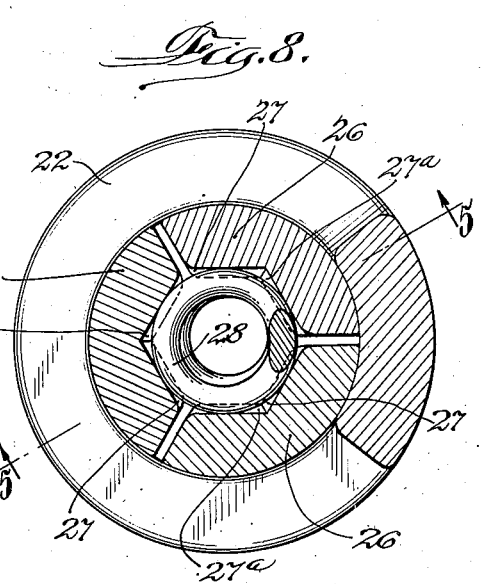

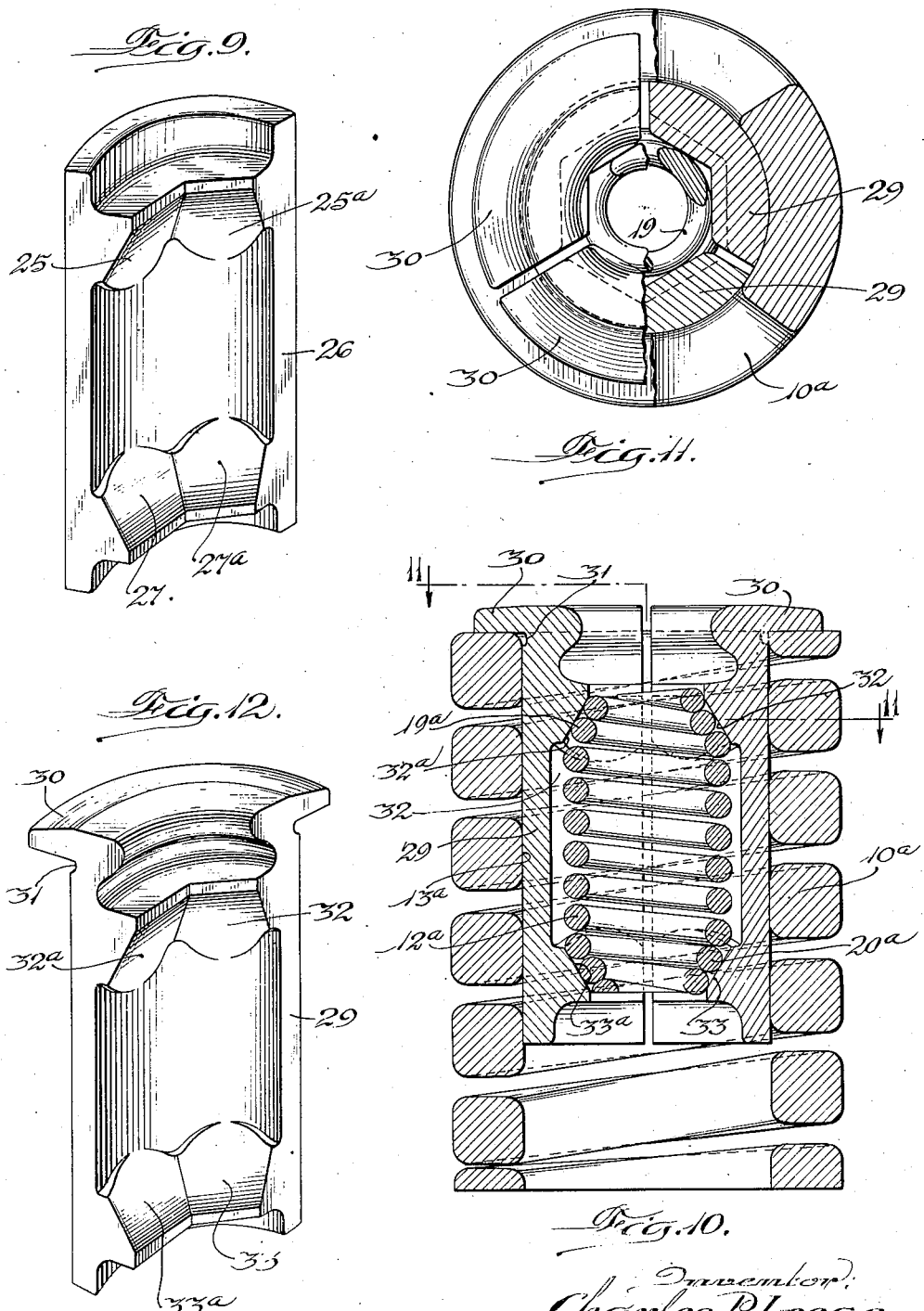

Patented May 17, 1949

2,470,172

UNITED STATES PATENT OFFICE 2,470,172

FRICTION BOLSTER SPRING

Charles P. Leese, Chicago, Ill., assignor to Standard Car Truck Company, Chicago, Ill., a corporation of New Jersey Application March 8, 1944, Serial No. 525,536

9 Claims. (Cl. 267—9)

1

This invention relates to certain new and useful improvements in spring assemblies of the friction shoe type adapted to be used individually or to be associated with a group of helical springs for supporting the bolster of a railway car truck.

The principal object of the invention is to provide an improved friction spring assembly of the above type which will apply pressure to a load supporting spring thereof by improved means of novel construction whereby the frictional pressure exerted by said shoes will function to damp the vibratory movements of the load spring and thereby prevent the development of objectionable harmonic movements of the friction spring assembly and of other springs which may be operatively grouped therewith.

According to the present invention, a load supporting helical spring is made from material of preferably rectangular configuration in cross section so that the spring will have flat inner surfaces and constitute in effect a cylinder. A plurality of friction shoe members are arranged within the spring member so as to bear against the inner perimeter of the spring and thereby damp or check the development of vibration of progressively increasing magnitude during the movement of the car along the track.

The said shoe members are provided on their inner faces with, preferably, opposed inwardly projecting wedge forming surfaces. A resilient member, preferably a coil spring, is arranged under compression within the space defined by said shoes so as to exert resilient force against the opposed wedging surfaces and thereby press the shoes outwardly against the load supporting spring. The spring for actuating the shoes, according to one embodiment of the invention, is formed at opposite ends with a plurality of the convolutions of the spring arranged in close relation to each other and converging toward the outer ends of the springs so as to form coneshaped wedge portions which coact with the wedge forming surfaces of the shoes to force the said shoes outwardly into frictional engagement with the load supporting spring.

According to another embodiment of the invention, a spring follower is engaged with one end of the load supporting spring and is provided with a central wedge-shaped portion which engages the wedge forming surfaces of the shoes adjacent one end thereof so as to maintain the shoe members near one end of the spring. A shoe actuating spring is interposed between the wedge portion of the follower and the wedge forming faces at the opposite end of the shoes. The end

2 of the spring adjacent the said wedge forming faces of the shoe is formed within the integral wedge portion which coacts with the said wedge forming faces of the several shoes to force them outwardly against the load supporting spring.

According to a further embodiment, the shoe members may be formed at their upper ends with lateral flanges adapted to seat on the load spring of the assembly; the shoes being formed, in each case, with wedge forming faces similar to those shown in the previously described embodiments.

The invention includes as a specific object the provision of the new and improved constructions, arrangements and combination of parts, as hereinabove briefly described, and disclosed in more detail in the specification which follows.

In the drawings:

Fig. 1 is a vertical sectional view illustrating the arrangement and construction of the various parts of one embodiment of the invention.

Fig. 2 is a plan view of the structure shown in Fig. 1.

Fig. 3 is a view in perspective of one of the friction shoes.

Fig. 4 is a side view in elevation of a shoe actuating spring forming a part of the structure shown in Fig. 1.

Fig. 5 is a view similar to Fig. 1 but illustrating a modified construction.

Fig. 6 is a plan view with parts shown in section of the modified embodiment shown in Fig. 5.

Fig. 7 is a side view in elevation of the shoe actuating spring forming a part of the embodiment shown in Fig. 5.

Fig. 8 is a sectional view taken on line 8—8 of Fig. 5 to illustrate the manner in which the shoe actuating spring engages certain wedging faces formed on the shoe members.

Fig. 9 is a view in perspective of one of the shoe members forming a part of the structure shown in Fig. 5.

Fig. 10 is a vertical sectional view illustrating the structural embodiments of another form of friction spring assembly.

Fig. 11 is a plan view of the structure shown in Fig. 10, and

Fig. 12 is a view in perspective of one of the shoe members forming a part of the structure shown in Fig. 10.

Referring first to Figs. 1 to 4, inclusive: 10 designates a load supporting spring, 11 one of the friction shoes for bearing against the inner perimeter of the load supporting spring, and 12 designates a shoe actuating spring for pressing the shoes against said spring 10.

The load supporting spring is made preferably from metal stock of rectangular configuration and cross section so as to provide flat inner surfaces 13 of substantial area against which the outer faces of the shoes bear. The said springs may be of any desired length or size, depending upon the particular situation in which they are to be used. The rectangular cross section of the spring coils make it practicable to provide the flat frictional surfaces hereinabove referred to and also provide a substantially stronger spring than when the spring is made from round stock.

A plurality of friction shoes 11 are arranged within the springs 10. Each shoe is arcuate in configuration so that the shoes when in assembled relation extend around the inner perimeter 13 of the spring 10, but with spaces 14 interposed between their adjacent edges. Each shoe member is formed on its inner surface with inwardly projecting portions 15 and 16, the inner faces of which are inclined to provide opposing cone segments 17 and 18. The cone segments 17 and 18 of the several shoes conjointly form opposing wedge faces against which the spring 12 exerts expansive force to hold the shoes in firm engagement with the said spring 10.

The shoe actuating spring 12, as illustrated in the present embodiment, is a helical spring having the convolutions at opposite ends thereof pressed together and progressively reduced in diameter so as to provide relatively rigid wedge portions 19 and 20 at opposite ends of the spring. The convolutions of the spring intervening between the wedge portions 19 and 20, when free of the assembly, are normally spaced a substantial distance apart, for example, as indicated in Fig. 4, but when the spring is applied in the assembly, its wedge end portions 19 and 20 fit into engagement with the inclined faces 17 and 18, respectively, of the shoe member and thereby press the shoes radially outwardly into firm frictional engagement with the inner perimeter of the spring 10. In assembling the several parts of the friction spring assembly shown in Fig. 1, the spring 12 is first compressed to a greater extent than shown in Fig. 1 and held in that condition by suitable clamping means not shown. The several shoes 11 are then arranged around the shoe actuating spring and the parts thus assembled are then inserted in spring 10 to the position substantially as illustrated in Fig. 1. The clamping devices for compressing the spring 12 are then removed so that, upon the expansion of said spring 12, its wedge ends 19 and 20 coact with the conical wedge faces 17 and 18 of the shoes to force the shoes into frictional engagement with the inner faces 13 of the spring 10.

In the embodiment shown in Fig. 5 a follower plate 21 seats against one end of the load supporting spring designated 22, for example, the upper end shown in Fig. 5, and is provided with a centrally arranged depending portion 23, the lower portion of which is of hexagonal form in cross section (see Fig. 6) with the several sides of the hexagon inclined upwardly and inwardly to form wedge faces 24. The said wedge forming faces 24 engage correspondingly formed wedge faces 25—25ª, formed on the inner surfaces of the shoe members 26. The engagement between the follower 21 and the shoes of the assembly serves to support the shoes in a position near the upper end of the load supporting spring 22.

The lower portion of each shoe member is provided with similarly inclined wedging faces 27—27ª; the wedging faces on each shoe being disposed at an angle to each other so that when the several shoes are in assembled relation the wedging faces 27—27ª collectively form a hexagonal configuration. A shoe actuating spring 28 seats against the lower portion of the follower 21 and is provided at its opposite end with a relatively rigid wedge portion 29, which corresponds in structure and function to the wedge portion 20 of the previously described embodiment. It will be observed in this connection that when the wedge portion 29 is in engagement with the wedge surfaces 27—27ª of the shoes, the curved convolutions of the spring will bear against the central portion of each wedge face, as shown in Fig. 8 of the drawings.

The several parts of the modified embodiment, as shown in Fig. 5, are assembled in much the same manner as that described in connection with the structure shown in Fig. 1 in that the shoe actuating spring is compressed against the depending portion of the follower 21 and maintained in this condition while the said depending portion of the follower and the spring are enclosed within the several shoe members. In this way the shoe members may be arranged with their edges in close relation so as to facilitate their insertion into the central space of the load supporting spring 22. When the spring 28 is then released it reacts to force the wedge ends 25—25ª of the shoes into firm engagement with the angularly disposed wedge surfaces 24 of the follower 21 and also exerts pressure on the angularly disposed surfaces 27—27ª so that the combined expansive force exerted against the follower and the last mentioned faces presses the shoes 26 radially outwardly against the inner perimeter of the load supporting spring 22.

The spring 28 exerts sufficient force to hold the surfaces 25—25ª of the shoes against the inclined wedging faces of the follower at all times during the compression and expansion of the load spring 22. Consequently, inasmuch as the expansive force of the said spring 28 is transmitted to the upper and lower end portions of the shoes, the shoes are pressed uniformly outwardly against the inner perimeter of the load spring. As the shoes wear, because of the frictional contact with the inner perimeter of the load spring, the inclined wedging faces 25—25ª of the shoes will slide downwardly on the flat, angularly disposed, wedge faces 24 of the follower so as to compensate for the said wear. By forming the series of surfaces 24 so that they define flat inclined surfaces, so arranged as to form a hexagonal configuration, the surfaces 25—25ª of the shoes bear flat against the cooperating faces of the follower. However, inasmuch as the lower wedge portion of the spring is circular, the spring will bear against the central portion of the wedge faces 27—27ª of the shoes.

Referring now to the modified embodiment shown in Figs. 10, 11 and 12:

The load spring and the friction shoe operating spring of this modification may be and preferably are identical with the corresponding elements shown in Fig. 1. These elements are therefore designated in the modification with the same reference numerals, with the addition of the exponent $a$.

The shoe members of the modification are designated by the reference numeral 29. Preferably there are three in number, but obviously any suitable number of shoes may be employed. Each shoe member is provided at its upper end with an outwardly extending flange 30, which seats on the upper coil of the spring 10ᵃ. The outer edge of the flange 30 of a newly formed shoe does not normally extend to the outer face of the load spring 10ᵃ so that when the shoe becomes thin from wear the outer end of the flange 30 will not extend beyond the outer face of the load spring. Preferably at the junction of the flange and the outer face of the shoe there is an annular recess 31 which provides sufficient clearance between the spring and the shoe to permit the wearing faces of the shoe to be worn down a substantial distance before the bottom of groove 31 is brought into contact with the upper coil of the spring. The inner surface of each shoe is provided near the upper and lower ends thereof with angularly disposed wedging faces 32—32ᵃ which incline toward the vertical center of the assembly to provide wedge faces for engagement with the upper wedge portion 19ᵃ of the spring 12ᵃ. These wedging faces correspond in arrangement and inclination to the wedge faces 24 illustrated in Fig. 5, so that when the several shoes are arranged in their operative positions the angular arrangement of the faces 32ᵃ define a hexagonal configuration. The lower portion of each shoe member 29 is provided with similar angularly disposed and inclined wedging faces designated 33—33ᵃ, which cooperate with the lower wedge portion 20ᵃ of the spring 12ᵃ.

The spring 12ᵃ, when in its assembled position within the shoes 29, exerts its expansive force against the wedging faces 32—32ᵃ and 33—33ᵃ of each of the shoes so as to press them radially outwardly into frictional contact with the inner face 13ᵃ of the load supporting spring 10ᵃ. Inasmuch as the wedging faces 32—32ᵃ and 33—33ᵃ are disposed at angles to each other, the wedge portions of the spring at opposite ends thereof will bear against the flat wedge faces of the shoe at substantially the middle of the faces as indicated in Fig. 8 of the drawing.

I claim:

1. A friction bolster spring for a railway car truck comprising a load supporting spring, a plurality of friction shoes arranged within the load supporting spring to bear directly against the inner perimeter thereof and formed on their inner surfaces with inclined wedge forming faces, and a resilient member arranged within the space defined by said shoes and formed at one end with a portion of decreasing diameter to provide an integral cone shaped wedge portion positioned to exert pressure against the wedge forming faces of said shoes, means at the other end of the resilient member connecting said resilient member to the shoes, whereby the force exerted by said resilient member presses the shoes outwardly against said inner perimeter of the spring to damp the movement thereof.

2. A friction bolster spring for a railway car truck comprising a load supporting spring, a plurality of friction shoes arranged within the load supporting spring to bear directly against the inner perimeter thereof and formed on their inner surfaces with opposed wedge forming faces, and a resilient member arranged under compression within the space defined by said shoes and formed at opposite ends with integral cone shaped portions to provide wedges positioned to press against the opposed wedge forming faces of said shoes, whereby the force exerted by said resilient member presses the shoes against the said inner perimeter of the load supporting spring to damp the movements thereof.

3. A friction bolster spring for a railway car truck comprising a load supporting spring, a plurality of friction shoes arranged within the load supporting spring to bear directly against the inner perimeter thereof and formed on their inner surfaces with inclined wedge forming faces, and a shoe actuating coiled spring formed with end coils of decreasing diameter to provide an integral wedge portion and arranged under compression within the space defined by said shoes with the wedge portion of the spring pressing against the wedge forming faces of the shoes, whereby the force exerted by said shoe actuating spring presses the shoes against the said inner perimeter of the load supporting spring.

4. A friction bolster spring for a railway car truck comprising a load supporting spring, a plurality of friction shoes arranged within the load supporting spring to bear directly against the inner perimeter thereof and formed on their inner surfaces with inclined wedge forming faces, a shoe actuating spring formed at one end with a plurality of coils of progressively decreasing diameter to provide a tapered portion forming a cone-shaped wedge and the spring arranged under compression within the space defined by said shoes with the said cone-shaped wedge portion of the spring engaging certain wedge forming faces of the shoes, whereby the force exerted by the shoe actuating spring presses the shoes against said inner perimeter of the load supporting spring.

5. A friction bolster spring for a railway car truck comprising a load supporting spring, a plurality of friction shoes arranged within the load supporting spring to bear directly against the inner perimeter thereof and formed on their inner surfaces with inclined wedge forming faces, a shoe actuating spring formed at one end with a tapered portion to provide a spring with a cone-shaped wedge composed of a plurality of spirals of the spring arranged in close relation to each other; the spring being positioned and under compression within the space defined by said shoes so that the wedge portion of the spring exerts pressure against certain wedge forming faces of the shoes to press the shoes outwardly against the inner perimeter of the load supporting spring.

6. A friction bolster spring for a railway car truck comprising a load supporting spring, a plurality of friction shoes arranged within the load supporting spring to bear directly against the inner perimeter thereof; each shoe being provided on its inner surface with a pair of inwardly projecting portions having opposed inclined faces which diverge from each other in directions toward the longitudinal center of the load supporting spring, a shoe actuating helical spring formed at opposite ends with coils of progressively decreasing diameter to provide conical wedge portions and interposed under compression between the said opposed inclined faces of the shoes so that the resilient force of the spring exerted against said shoes press them outwardly against the inner perimeter of the load supporting spring.

7. A friction bolster spring for a railway car truck comprising a load supporting spring, a plurality of friction shoes arranged within the load supporting spring to bear against the inner perimeter thereof and formed near their upper and lower ends with inwardly projecting wedge forming faces, a follower member engaging the upper end of the load spring and formed with wedge surfaces in fixed relation to the follower and engaging the wedge forming faces at the upper ends of said shoes and a shoe actuating spring interposed under compression between said follower and the other wedge forming faces of the shoes, whereby the expansive force of the last mentioned spring exerts pressure lengthwise of the shoes to maintain the upper wedge forming faces of the shoes in engagement with the wedge surfaces of the follower during the compression and expansion movements of the load supporting spring and to press the shoes outwardly against the inner perimeter of the load supporting spring.

8. A friction bolster spring for a railway car truck comprising a load supporting spring, a plurality of friction shoes arranged within the load supporting spring to bear against the inner perimeter thereof; each of said shoes being formed with a pair of inwardly projecting portions formed with angularly disposed surfaces which incline lengthwise of the shoes to provide wedge forming faces, and which when the shoes are in their assembled relation define hexagonal configurations adjacent opposite ends of the assembly, a follower member engaging one end of the load supporting spring and formed with a hexagonal portion, the angularly disposed outer faces of which are inclined to form wedge faces which extend under and engage the wedge forming faces at the upper end of the shoes, and a shoe actuating spring interposed between said follower and the other wedge forming faces of the shoes, the said spring being provided at one end thereof with a plurality of coils of progressively decreasing diameters and arranged in surface contact with each other to form a vertically rigid integral wedge portion for engaging said other wedge forming faces of the shoes.

9. A friction bolster spring for a railway car truck comprising a load supporting spring, a plurality of friction shoes arranged within the load supporting spring to bear directly against the inner perimeter thereof, each shoe being formed at one end with an outwardly extending flange for engagement with the upper end portion of the load spring, but terminating at a location spaced inwardly from the outer perimeter of the spring, each shoe member being formed on its inner surface, adjacent its upper and lower ends, with angularly disposed faces which incline lengthwise of the assembly to form wedge portions, and a shoe actuating spring formed at opposite ends with coils of progressively decreasing diameters to form integral wedge portions and arranged under compression between the said wedge portions of the shoe adjacent the opposite ends thereof whereby the resilient pressure exerted by said actuating spring forces the shoes radially outwardly against the inner perimeter of the load supporting spring.

CHARLES P. LEESE.

REFERENCES CITED

The following references are of record in the file of this patent:

UNITED STATES PATENTS

| Number | Name | Date |
| --- | --- | --- |
| 1,127,657 | McCormick | Feb. 9, 1915 |
| 1,168,448 | Westinghouse | Jan. 18, 1916 |
| 1,170,146 | Gallagher | Feb. 1, 1916 |
| 1,329,795 | O'Connor | Feb. 3, 1920 |
| 1,675,760 | Manzel | July 3, 1928 |
| 2,097,523 | Hedgcock et al. | Nov. 2, 1937 |
| 2,182,917 | Dentler | Dec. 12, 1939 |
| 2,189,208 | Holland | Feb. 6, 1940 |
| 2,216,473 | Hobson | Oct. 1, 1940 |
| 2,242,413 | Blattner | May 20, 1941 |
| 2,254,781 | Rabbitt | Sept. 2, 1941 |

FOREIGN PATENTS

| Number | Country | Date |
| --- | --- | --- |
| 439,296 | Germany | Jan. 6, 1927 |